(12) United States Patent
Schroeder et al.

(10) Patent No.: US 9,388,290 B2
(45) Date of Patent: Jul. 12, 2016

(54) BATCHES OF CROSS-LINKING AGENTS, CONTAINING MARKING SUBSTANCES, NOVEL CROSS-LINKABLE RUBBER MIXTURES, METHOD FOR THE PRODUCTION THEREOF, AND USE OF SAME

(75) Inventors: Andreas Schroeder, Weinheim (DE); Martin Saewe, Little Rock, AR (US); Vincenza Meenenga, Schwetzingen (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 644 days.

(21) Appl. No.: 13/503,213

(22) PCT Filed: Oct. 20, 2010

(86) PCT No.: PCT/EP2010/065774
§ 371 (c)(1),
(2), (4) Date: Sep. 7, 2012

(87) PCT Pub. No.: WO2011/048129
PCT Pub. Date: Apr. 28, 2011

(65) Prior Publication Data
US 2013/0001466 A1    Jan. 3, 2013

(30) Foreign Application Priority Data
Oct. 23, 2009 (EP) .................................. 09173921

(51) Int. Cl.
   *C08K 3/22*    (2006.01)
   *C08K 13/02*    (2006.01)
   *C09K 3/00*    (2006.01)
   *C08L 7/00*    (2006.01)
   *C08J 3/22*    (2006.01)
   *C08K 3/00*    (2006.01)
   *C08J 3/24*    (2006.01)
   (Continued)

(52) U.S. Cl.
   CPC ............... *C08K 3/0091* (2013.01); *C08J 3/242* (2013.01); *C08J 3/248* (2013.01); *C08K 3/0016* (2013.01); *C08K 3/0083* (2013.01); *C08K 5/0025* (2013.01); *B29K 2105/0052* (2013.01)

(58) Field of Classification Search
   USPC ......................................... 524/403, 432, 572
   See application file for complete search history.

(56) References Cited

U.S. PATENT DOCUMENTS

| 6,348,432 B1 | 2/2002 | Elmasry |
| 6,644,122 B2 | 11/2003 | Borowczak et al. |
| 7,202,295 B2 | 4/2007 | Simonot et al. |

(Continued)

FOREIGN PATENT DOCUMENTS

| DE | CH536655 A | 5/1973 |
| WO | 0203950 A2 | 1/2002 |

(Continued)

OTHER PUBLICATIONS

State Intellectual Property Office of P.R.C., First Office Action with Search Report, mailed Jan. 23, 2014.

(Continued)

*Primary Examiner* — Joseph D Anthony

(57) ABSTRACT

The invention relates to novel batches of cross-linking agents, containing marking substances, to novel cross-linkable rubber mixtures, to a method for the production thereof and to the use of same.

16 Claims, 2 Drawing Sheets

(51) Int. Cl.
*C08K 5/00* (2006.01)
*B29K 105/00* (2006.01)

(56) References Cited

U.S. PATENT DOCUMENTS

| | | | |
|---|---|---|---|
| 2003/0216494 A1* | 11/2003 | Roth et al. | 524/95 |
| 2005/0112768 A1* | 5/2005 | Evans | G11B 7/2534 436/56 |
| 2005/0277710 A1* | 12/2005 | Joyce | G01N 33/442 523/210 |
| 2007/0088095 A1 | 4/2007 | Tamaki et al. | |
| 2008/0283805 A1 | 11/2008 | Eickschen et al. | |
| 2010/0003762 A1* | 1/2010 | Kolbe | C08K 5/0008 436/85 |
| 2010/0029852 A1 | 2/2010 | Borkowsky et al. | |
| 2011/0213098 A1* | 9/2011 | La Camera et al. | 525/426 |
| 2011/0251310 A1* | 10/2011 | Hill et al. | 524/112 |
| 2011/0251315 A1* | 10/2011 | Hill et al. | 524/133 |
| 2012/0108758 A1* | 5/2012 | Laignel et al. | 525/330.3 |

FOREIGN PATENT DOCUMENTS

| WO | 2008040670 A1 | 4/2008 |
|---|---|---|
| WO | 2010000677 A2 | 1/2010 |

OTHER PUBLICATIONS

International Search Report from co-pending Application PCT/EP2010/065774 dated Jan. 25, 2011, 2pages.

* cited by examiner

BATCHES OF CROSS-LINKING AGENTS, CONTAINING MARKING SUBSTANCES, NOVEL CROSS-LINKABLE RUBBER MIXTURES, METHOD FOR THE PRODUCTION THEREOF, AND USE OF SAME

The invention relates to novel crosslinking agent masterbatches comprising marker substances, to novel crosslinkable rubber mixtures, and to a process for producing these, and to the use of these.

BACKGROUND INFORMATION

PCT/EP2009/058041 discloses separate production of crosslinking agent masterbatches with the aim of introducing these continuously into the parent mixtures produced batchwise. Although this process has the advantage that it can produce crosslinkable rubber mixtures in a manner which is more practical and which provides better performance, the quality of dispersion of the crosslinking agent masterbatch in the rubber mixture cannot be demonstrated—or if it can be demonstrated this is possible only offline.

SUMMARY OF THE INVENTION

It was therefore an object of the present invention to provide novel crosslinking agent masterbatches which permit online, and also preferably inline, detection for determining the quality of dispersion of the crosslinking agent masterbatch.

The object underlying this invention was achieved via crosslinking agent masterbatches which comprise marker substances.

DESCRIPTION OF THE INVENTION

Figure 1:
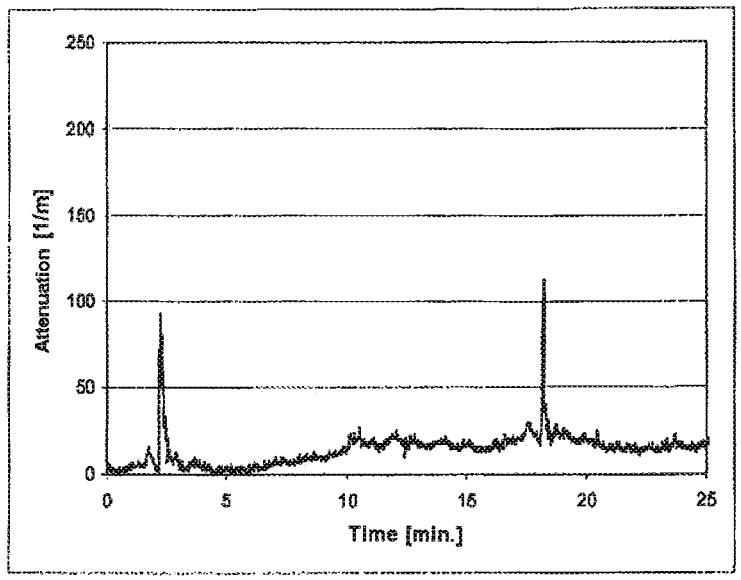
FIGS. 1-4 show a detected ultrasound signal from various embodiments according to the invention.

The present invention therefore provides crosslinking agent masterbatches comprising at least one pulverulent marker substance of density greater than 2 $g/cm^3$ and at least one crosslinking agent selected from the group of sulfur, sulfur donors, peroxides, resorcinol, aldehyde-amine condensates, bisphenols, quinone dioximes, carbamates, triazines, thiazoles, dithiocarbamates, thiurams, thioureas, mercapto accelerators, sulfenamides, thiophosphate accelerators, dithiophosphate accelerators, and/or guanidine.

It is preferable that at least one compound selected from the following groups is used as pulverulent marker substance for the purposes of the invention:

the alkali metal compounds and alkaline earth metal compounds,
the compounds of the transition groups of the periodic table of the elements,
the silicon compounds,
the aluminum compounds,
the selenium compounds and tellurium compounds,
the tin compounds,
the lead compounds, the bismuth compounds,
the compounds of the rare earths,—the heavy metal powders,
the coated metal powders and/or compounds of these,
the metal carbides, particularly preferably tungsten carbides, and/or
the naturally occurring minerals,
the heavy metal powders (density>5 $g/cm^3$), for example carbonyl iron powder, and/or
the coated heavy metal powders and/or their compounds, for example phosphated or silicon-dioxide-coated iron powder.

Particular preference is given here to the following as marker substances:

halides, sulfates, carbonates, oxides, and/or sulfides of rubidium-, of cesium, of calcium, of strontium, and/or of barium, very particularly preferably barium sulfate or barium oxide,
oxides of magnesium, zinc, titanium, zirconium, tungsten, iron, silicon, aluminum, tin, lead, bismuth, selenium, tellurium, hafnium, gadolinium, and/or cerium,
sulfides of zinc, tungsten, lead, and/or bismuth,
tantalum powder, tungsten powder, gold powder, platinum powder, and/or iridium powder,
tungstates, ferrites, silicates, particularly preferably barium silicate,
aluminates, particularly preferably strontium aluminates, and/or rare-earth-doped strontium aluminates and/or rare-earth-doped alkaline earth metal aluminates, tin chlorides, carbonyl iron powder, and/or phosphated or silicon-dioxide-coated iron powder, and/or tungsten carbides, and/or
minerals selected from the group of antimonite, apatite, albite, almandine, anhydrite, aragonite, argentite, anglesite, arsenopyrite, baryte, bauxite, galena, cassisterite, cerussite, chloanite, celestine, dolomite, feldspar, fluorite, graphite, mica, ilmenite, kaolin, corundum, cryollite, corrundum, magnetite, molybdenite, muscovite, montmorilonite, monazite, magensite, pyrite, quartz, rutile, scheelite, sperrylite, strontianite, tantalite, topaz, uraninite, vanadinite, bismuth, bismuthinite, wolframite, wollastonite, willemite, wulfenite, cinnabar, and/or zircon.

Preference is given to inorganic compounds as marker substances.

In another embodiment of the invention, preference is given to the use of oxidation-resistant compounds.

Preference is equally given to the use of a combination of compounds from the abovementioned groups. The term combination here means either a combination of compounds from the individual groups or else within the abovementioned groups, or else a combination thereof.

The substances involved here are commercially available. The coating of the powders is achieved by the processes familiar to the person skilled in the art.

The density of the marker substances is preferably at least 3.5 $g/cm^3$, particularly preferably greater than 5.5 $g/cm^3$, very particularly preferably greater than 7.5 $g/cm^3$.

Preference is given here to pulverulent marker substances with a particle size of from 1 μm to 100 μm, particularly from 1 μm to 25 μm.

The term pulverulent here encompasses all of the abovementioned substances that are solid at temperatures below 130° C., preferably below 100° C.

The pulverulent marker substances here can also optionally be used in pelletized form, for example as polymer-bound additives.

The proportion of marker substances is preferably less than 50% by weight, with preference less than 10% by weight, with particular preference less than 5% by weight, based on the crosslinking agent masterbatch.

The marker substances here are preferably suitable for detection by means of ultrasound, but other measurement methods are not excluded, examples being XFA (X-ray fluorescence analysis), NIR (near-infrared spectroscopy), LIPS (laser-induced plasma spectroscopy), terahertz spectroscopy, and UV/VIS spectroscopy.

The term crosslinking agent masterbatch here encompasses a blend of at least one crosslinking agent with at least one marker substance and optionally with further additives, e.g. binders and/or optionally stabilizers, plasticizers, fillers, and/or other auxiliaries.

For the purposes of the invention, crosslinking agents are: substances forming network nodes, e.g.

- sulfur (soluble or insoluble) and/or sulfur donors, e.g. dithiomorpholine (DTDM), tetramethylthiuram disulfide (TMTD), tetraethylthiuram disulfide (TETD), dipentamethylenethiuram terasulfide (DPTT), phosphoryl polysulfide, e.g. Rhenocure® SDT/S from Rhein Chemie Rheinau GmbH, and/or
- peroxides, e.g. di-tert-butyl peroxide, di(tert,butylperoxytimethylcyclohexane, di(tert,butylperoxyisopropyl) benzene, dicumyl peroxide, dimethyldi(tert-butylperoxy)hexyne, butyldi(tert,butylperoxy) valerate,
- resorcinol, aldehyde-amine condensates, e.g. hexamethylenetetramine, resorcinol-formaldehyde precondensates, and/or vulcanization resins, e.g. halomethylphenol resin,
- quinone dioximes, and
- bisphenols,
- accelerators, e.g.
- carbamates or triazines, e.g. hexamethylenediamine carbamate (HMDC), organic triazines,
- thiazoles, e.g. 2-mercaptobenzothiazole (MBT), zinc mercaptobenzothiazole (ZnMBT), thiadiazoles (TDD),
- sulfenamides, such as cyclohexylbenzothiazolesulfenamide (CBS), dibenzothiazyl disulfide (MBTS), butylbenzothiazolesulfenamide (TBBS), dicyclohexylbenzothiazolesulfenamide (DCBS), 2-(4-morpholinylmercapto)-benzothiazole (MBS),
- thiurams, such as tetramethylthiuram monosulfide (TMTM), tetraethylthiuram disulfide (TETD), tetramethylthiuram disulfide (TMTD), tetrabenzylthiuram disulfide (TBTD), dipentamethylenethiuram tetra(hexa)sulfide (DPTT),
- dithiocarbamates, such as Zn dimethyldithiocarbamate (ZDMC), Cu dimethyldithiocarbamate, Bi dimethyldithiocarbamate, Zn diethyl-dithiocarbamate (ZDEC), tellurium diethyldithiocarbamate (TDEC), Zn dibutyldithiocarbamate (ZDBC), Zn ethylphenyldithiocarbamate (ZEPC), Zn dibenzyldithiocarbamate (ZBEC), Ni dibutyldithiocarbamate (NBC), selenium diethyldithiocarbamate (SeEDC), selenium dimethyldithiocarbamate (SeDMC), tellurium diethyldithiocarbamate (TeEDC),
- thiophosphate- and dithiophosphate, e.g. zinc O,O-di-n-butyl dithiophosphate (ZBDP), zinc O-butyl-O-hexyl dithiophosphate, zinc O,O-diisooctyl dithiophosphate (ZOPD), dodecylammonium diisooctyl dithiophosphate (AOPD), e.g. the Rhenogran® products ZDT, ZAT, and ZBOP from Rhein Chemie Rheinau GmbH
- urea/thioureas, e.g. ethylenethiourea (ETU), N,N,N',N'-tetramethylthiourea (TMTU), diethylthiourea (DETU), dibutylthiourea (DBTU), 3-(3,4-dichlorophenyl)-1,1-dimethylurea (diuron) etc., and/or
- xanthate accelerators, e.g. zinc isopropyl xanthate (ZIX),
- guanidines, e.g. diphenylguanidine (DPG) and/or N',N-di-ortho-tolylguanidine (DOTG), and the guanidine-free replacement accelerators, such as Rhenogran® XLA 60, retarders, e.g.
- N-nitrososdiphenylamine, N-cyclohexylthiophthalimide (CPT), e.g. Vulkalent® G), sulfonamide derivatives (e.g. Vulkalent® E/C), phthalic anhydride (Vulkalent® B/C), where both of the Vulkalent® products are obtainable from Lanxess Deutschland GmbH, and also benzoic anhydride.

All of the abovementioned products are products which are available commercially and which are optionally also used in pelletized form, for example as polymer-bound additives.

It is preferable here to use mixtures of various crosslinking agents, such as sulfur, sulfur donors, peroxides, resorcinol, aldehyde-amine condensates, bisphenols, quinone dioximes carbamates, triazines, thiazoles, dithiocarbamates, thiurams, thioureas, mercapto accelerators, sulfenamides, xanthate accelerators, thiophosphate accelerators, dithiophosphate accelerators, and/or guanidine.

Preference is given here to a mixture of crosslinking agents where the melting point thereof is below 120° C., particularly preferably below 100° C., an example being a mixture of sulfur, CBS (cyclohexylbenzothiazylsulfenamide), and also MBTS (methylbenzothiazyl disulfide).

In another preferred embodiment of the invention, the crosslinking agent masterbatch of the invention also comprises binders and/or optionally stabilizers, fillers, plasticizers, and/or other auxiliaries.

The proportion of these additional constituents, such as binders, etc., is preferably less than 30%, based on the crosslinking agent masterbatch.

Binders selected are preferably water-insoluble uncrosslinked polymers of which the polarity, melting points, crystallinity, and/or surface structures are similar to those of the rubber mixture, with resultant improvement of the mixing process, i.e. with resultant rapid achievement of a homogeneous result of mixing. The binders can moreover preferably be crosslinked with the rubber mixture. The glass transition temperature is preferably <0° C.

Particularly suitable polymers are natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluoro rubber (FKM), perfluorinated fluoro rubber (FFKM), acrylate-ethylene rubber (AEM), acrylate rubber (ACM), ethylene-methylene-acrylate rubber (EMA), chlorinated polyethylene, chlorosulfonated polyethylene, polyethylene, ethylene-vinyl acetate rubber (EVA), ethylene-epichlorohydrin rubber (ECO), epichlorohydrin rubber (CO), and/or polyurethane rubber (PU).

Examples of stabilizers for the purposes of the invention are coloring and noncoloring antioxidants, e.g. paraphenylenediamine, isopropylphenylparaphenylenediamine (IPPD), para-phenylenediamine (6PPD), N,N-ditoly-p-phenylenediamine (DTPD), etc., amines, e.g. trimethyl-1,2-dihydroquinoline (TMQ), (phenyl)amine)-1,4-naphthalenedione (PAN), bis(4-octylphenyl)amine (ODPA), styrenated diphenylamine (SDPA), mono- and bisphenols, e.g. 2,2'-methylenebis(4-methyl-6-tert-butylphenol) (BPH), 2,2'-isobutylidenebis(4,6-dimethylphenol) (NKF), 2,2'-dicyclopentadienylbis(4-methyl-6-tert-butylphenol) (SKF), 2,2'- methylenebis(4-methyl-6-cyclohexylphenol (ZKF), 2,6-di-tert-butyl-p-cresol (BHT), substituted phenol (DS), styrenated phenols (SPH), mercatpbenzimidazoles, e.g. 2-mercaptobenzimidazole (MBI), 2-mercaptomethylbenzimidazole (MMBI), zinc 4- and 5-methyl-2-mercaptobenzimidazole (ZMMBI), etc., olefins, and paraffinic and/or aromatic plasticizers. The composition here is selected to be appropriate to the desired final product.

Examples of fillers for the purposes of the invention are in particular pale-colored inorganic fillers, e.g. mica, kaolin, siliceous earth, silica, chalk, talc powder, carbon fillers, e.g. carbon black, graphite, carbon nanotubes, magnetizable fillers, such as carbonyl iron powder, iron oxides, ferrites, and/or fibers, e.g. aramid fiber pulp, and carbon fibers Examples of plasticizers for the purposes of the invention are long-chain esters and/or ethers, e.g. thioesters, phthalic esters, alkylsulfonic esters, adipic esters, sebacic esters, dibenzyl ethers, and/or mineral oils (paraffinic, aromatic naphthenic or synthetic oils).

Examples of auxiliaries for the purposes of the invention are dispersing agents, e.g. fatty acids, stearic acids and/or oleic acid, and/or activators, for example lithium carbonate, sodium carbonate and/or calcium hydroxide.

It is preferable that the composition of the crosslinking masterbatch here is as follows: zinc oxide (about 10% to 50%), sulfur, CBS (cyclohexylbenzothiazylsulfenoamide, about 10% to 30%), and/or MBTS (methylbenzothiazyl disulfide, about 10% to 30%), and/or ZBOP (about 10 to 30%), EPDM/EPM, EVA, and/or plasticizer (about 20%) together with at least one pulverulent marker substance (about 10%), where the data are based on percentages by weight and the entirety of the components used is 100%.

The melting point of this mixture, below 100° C., is markedly lower than that of the individual components, where the melting points of the individual components are as follows:

sulfur (melting point: about 115° C.), CBS (melting point: about 100° C.), and MBTS (melting point: about 180° C.).

These components are accordingly markedly more difficult to process as individual components at T<100° C.

The crosslinking agent masterbatches of the invention can be produced here by mixing the marker substances with the crosslinking agent, and optionally also binder and/or optionally stabilizers fillers, plasticizer, and/or further auxiliaries at temperatures which are ≤120° C., preferably ≤100° C., with particular preference ≤80° C. This is ideally achieved in such a way that no reaction of the crosslinking agents takes place during the mixing process.

This problem-free method can give a very homogeneous mixture of the marker substances with the crosslinking agent and optionally also binder and/or optionally stabilizers fillers, plasticizer, and/or further auxiliaries. It is possible here to use any of the conventional mixing assemblies, such as powder mixers, concrete mixers, agitator systems, mixing drums, internal mixers, twin-screw or other extruders, or the like.

Examples of homogeneous mixtures for the purposes of the invention are mixtures of powders, drum-mixed mixtures of pellets of polymer-bound additives, polymer-bound powder mixtures produced in an internal mixer or extruder, etc.

The processes for producing the crosslinking agent masterbatches of the invention, by which marker substances are mixed with crosslinking agents and optionally also binder, and/or optionally stabilizers fillers and/or further auxiliaries at temperatures which are preferably ≤100° C.

The invention further provides crosslinkable rubber mixtures comprising the crosslinking agent masterbatches of the invention which have been described above.

For the purposes of the invention, the crosslinkable rubber mixtures involve a parent mixture which comprises rubber. This mixture comprises polymers and blends of these, where the blends have elastic properties after crosslinking, examples being natural rubber (NR), isoprene rubber (IR), styrene-butadiene rubber (SBR), butadiene rubber (BR), isoprene-isobutylene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluoro rubber (FKM), perfluorinated fluoro rubber (FFKM), acrylate-ethylene rubber (AEM), acrylate rubber (ACM), chlorinated polyethylene, chlorosulfonated polyethylene, ethylene-vinyl acetate rubber (EVA), ethylene-epichlorohydrin rubber (ECO), epichlorohydrin rubber (CO), and/or polyurethane rubber (PU).

Other constituents of the parent mixtures can in particular be pale-colored inorganic fillers, e.g. mica, kaolin, siliceous earth, silica, chalk, talc powder, zinc oxide, carbon fillers, e.g. carbon black, graphite, carbon nanotubes, and/or magnetizable fillers, such as carbonyl iron powder, iron oxides, ferrites, fibers, e.g. aramid fiber pulp, carbon fibers, and/or coloring and noncoloring antioxidants, such as paraphenylenediamine (isopropylphenylparaphenylenediamine/(IPPD), para-phenylenediamine (6PPD), N,N-ditolyl-p-phenylenediamine (DTPD), etc)., amines, e.g. trimethyl-1,2-dihydroquinoline (TMQ), (phenyl)amine]-1,4-naphthalenedione (PAN), bis(4-octylphenyl)amine (ODPA), styrenated diphenylamine (SDPA), etc.), mono- and bisphenols, e.g. the Vulkanox products 2,2'-methylenebis(4-methyl-6-tert-butylphenol (BPH), 2,2'-isobutylidenebis(4,6-dimethylphenol) (NKF), 2,2'-dicyclopentadienylbis(4-methyl-6-tert-butylphenol) (SKF), 2,2'-methylenebis(4-methyl-6-cyclohexylphenol (ZKF), 2,6-di-tert-butyl-p-cresol (BHT), substituted phenol (DS), styrenated phenols (SPH), mercatobenzimidazoles, e.g. 2-mercaptobenzimidazole (MBI), 2-mercaptomethylbenzimidazole (MMBI), zinc 4- and 5-methyl-2-mercaptobenzimidazole (ZMMBI), etc.), and olefins and/or paraffinic, aromatic and/or naphthalenic plasticizers, dispersing agents, and also optionally a portion of the crosslinking agents (e.g.: sulfur). However, the parent mixture can also be composed exclusively of rubber.

The invention further provides a process for producing a crosslinkable rubber mixture by mixing the crosslinking agent masterbatch of the invention continuously with a parent mixture which comprises rubber and which is produced batchwise. The resultant crosslinkable rubber mixture is preferably extruded continuously.

The parent mixture is preferably produced by the processes familiar to the person skilled in the art, for example those described in PCT/EP2009/058041.

The crosslinking agent masterbatch is then metered continuously into said parent mixture produced batchwise, and the finished mixture is then extruded continuously.

Since the crosslinking agents in the preferred crosslinking agent masterbatch of the invention have already been mixed homogeneously with one another, the continuous metering process facilitates homogeneous dispersion of the crosslinking agents in the parent mixture. The overall resultant effect can be to reduce the risk that the mixing of the parent mixture with the crosslinking agents is a cause of failure of the desired continuous production process under practical conditions.

It is preferable here that the proportion of crosslinking agent masterbatch, based on the crosslinkable rubber mixture, is less than 10% by weight.

In a preferred embodiment of the process of the invention, the crosslinking agent masterbatch is mixed continuously with the parent mixture. This can be achieved, for example, by means of gravimetric metering assemblies with integrated differential metering balance, e.g. from Brabender.

In one embodiment of the invention, the crosslinking agent masterbatch is introduced with high pressure into the parent mixture, which is in particular conveyed at comparatively low gauge pressure here. For the purposes of the present invention, a high pressure is in particular more than 10 bar, preferably at least 50 bar, particularly preferably at least 100 bar. A result of this, solely due to the high feed pressure, is that turbulence causes immediate dispersion of the crosslinking agent masterbatch in the parent mixture, and this contributes to rapid production of a homogeneous mixture.

In one preferred embodiment of the invention, for the crosslinking of a mixture, the crosslinking agent masterbatch is pumped with a high pressure which is preferably at least 50 bar into a parent mixture which comprises rubber, and the parent mixture is then mixed with the crosslinking agent masterbatch in a mixing apparatus.

It is preferable that the parent mixture is transported in an extruder which preferably has only one screw, while the crosslinking agent masterbatch is pumped with high pressure into the parent mixture. The large pressure difference produces turbulence. Accordingly, the time required for the extruder to achieve further mixing can be reduced.

In another embodiment of the invention, the crosslinking agent masterbatch is pumped by a gear pump into the parent mixture. A gear pump can firstly generate the desired high pressure and can secondly provide suitable metered introduction of the material.

In another embodiment of the invention, further separate metering apparatuses, e.g. metering balances, extruders, gear pumps, are used to meter crosslinking agents optionally with binder, stabilizers, fillers, and/or plasticizer, separately from the crosslinking agent masterbatch of the invention, into the parent mixture.

The invention also provides crosslinkable rubber mixtures attainable by the abovementioned processes of the invention.

The invention also provides the use of the crosslinking agent masterbatches of the invention for controlling the dispersion of the crosslinking agents in the rubber mixture, where the quality of dispersion is preferably measured by means of ultrasound, but other measurement methods are not excluded, examples being RFA (X-ray fluorescence analysis), NIR (near-infrared spectroscopy), LIPS (laser-induced plasma spectroscopy), terahertz spectroscopy, and UV/VIS spectroscopy. It is preferable here that the crosslinkable rubber mixture is conveyed continuously, for example by an extruder, through a measurement head.

The examples below serve to illustrate the invention, but without any limiting effect.

WORKING EXAMPLES

The substances used here comprised the following:
SMR 10=natural rubber (Standard Malaysian Rubber SMR 10),
N550=carbon black from Evonik Degussa, AG,
Vivatec 500=a mineral oil (TDAE oil) as plasticizer,
Dutral CO 054=an ethylene-propylene-diene polymer from EniChem SpA,
Weissiegel zinc oxide, obtainable from Brüggemann,
Sulfur powder, obtainable from Brüggemann,
MBTS=di(benzothiazol-2-yl)disulfide, obtainable as Vulcacit® DM/C from Lanxess Deutschland GmbH,
Rhenocure® ZBOP/S from Rhein Chemie Rheinau GmbH,
Paraffinic plasticizers (R2 spindle oil from Shell AG),
PL pigment MHG-4E and PL pigment MHG-4B=doped strontium aluminates $(SrAl_2O_4:Eu_{+2},Dy_{+2},B_{+3})$, obtainable from LanXi MinHui Photoluminescent Co., Ltd.
Sicopal Schwarz K0095=chromium iron oxide, obtainable from BASF AG, 5.2 g/ml,
Hostasol Yellow 3G=fluorescent naphthalimide, obtainable from Clariant AG,
Hostasol Red 5B=thioindigold colorant, obtainable from Clariant AG.

Data in phr relate to data in parts by weight per 100 parts by weight of rubber

Working Example 1

A single-screw extruder (compact extruder from Brabender) was used at 60 rpm and T=90° C. to extrude a pelletized rubber mixture KM with Mooney viscosity ML 1+4 (100° C.)=60 MU, composed of 100 phr of SMR 10 natural rubber, 55 phr of N550 furnace black, 5 phr of plasticizer (Vivatec 500), and 1 phr of stearic acid. Throughput was about 1 kg/h. The extruded strip was about 5 cm wide and 4 mm thick. The measurement die had two ultrasound transducers from Krautkrämer. The average frequency of the sound source was 5 MHz. The pulse-transmission method was used to determine the amplitude attenuation during extrusion of the extruded strip, between the ultrasound source and the ultrasound receiver. Two measurements were made, with different amounts added of the crosslinking agent masterbatch VB 1.

FIG. 1 shows the curve for ultrasound signal (attenuation) plotted against time, covering both of the measurements. Variation (baseline drift) during extrusion of the rubber mixture is very small at <20 m−1. Baseline noise is about 1 m−1.

The following were fed into the rubber mixture (pulsed input), about 3.2 g of the crosslinking agent masterbatch VB 1 of the invention (density=1.75 g/ml) composed of 100 phr of EPM (Dutral CO 054 from EniChem SpA), 233 phr of Weissiegel zinc oxide with density 5.6 g/ml (Brüggemann), 100 phr of sulfur powder, 100 phr of MBTS (Vulcacit® DM/C Lanxess Deutschland GmbH), 53 phr of a dithiophosphate accelerator (Rhenocure ZBOP/S from Rhein Chemie Rheinau GmbH), and also 33 phr of a paraffinic plasticizer (R2 spindle oil, Shell). The single-strip extruder has little mixing action, and this is apparent from the fact that, after addition of crosslinking agent masterbatch VB 1, the response signal detected rises steeply and in turn immediately falls, taking the form of a peak at t=3 min. The height of the peak is about 100 m$^{-1}$. The response signal is attributable to the change in attenuation properties resulting from the changed constitution of the extruded strip (addition of crosslinking agent masterbatch VB 1).

When about 1.6 g of the crosslinking agent masterbatch VB 1 of the invention are added, the signal detected is in turn more intense at t=18 min. The height of the peak is again about 100 m$^{-1}$. Because the amount added of crosslinking agent masterbatch VB 1 is smaller, the full width at half height of the peak here is smaller than that of the peak at t=3 min (addition of 3 g of CB1). The baseline is moreover somewhat higher.

The measurements show that the crosslinking agent masterbatch VB 1 of the invention can be detected with the aid of ultrasound technology.

Working Example 2

In accordance with working example 1, the rubber mixture KM was extruded with a Mooney viscosity ML 1+4 (100°

C.)=60 MU, being composed of 100 phi of SMR 10 natural rubber, 55 phr of N550 furnace black, 5 phr of plasticizer (Vivatec 500), and 1 phi of stearic acid. The extrudate was analyzed as in working example 1, using the ultrasound transducers.

The amounts listed below of crosslinking agent masterbatch VB2 of the invention were fed (pulsed input) into the rubber mixture KM as in working example 1. Crosslinking agent masterbatch VB2 is composed of the constituents mentioned in working example 1: 100 phr of Dutral CO 054 EPM from EniChem SpA, 156 phr of zinc oxide (Weissiegel from Brüggemann), 67 phr of sulfur powder, 67 phr of MBTS (Vulcacit® DM/C Lanxess Deutschland GmbH), 36 phr of a dithiophosphate accelerator (Rhenocure® ZBOP/S from Rhein Chemie Rheinau GmbH), and also 33 phr of a paraffinic plasticizer (R2 spindle oil, Shell). Crosslinking agent masterbatch CB2 also comprises further marker substances, in each case using a proportion of 33 phr: CM standard grade carbonyl iron powder (BASF, 7.9 g/ml), 2 luminescent pigments made of europium/dysprosium/boron-doped strontium aluminates with density of 3.6 g/ml (PL pigment MHG-4E and PL pigment MHG-4B LanXi MinHui photoluminescent Co., Ltd. In each case 3.6 g/ml) with different average particle size, chromium iron oxide (Sicopal Schwarz K0095 BAS, using 5.2 g/ml), with a fluorescent naphthalimide (Hostasol Yellow 3G, 1.17 g/ml), and with a fluorescent thioindigold colorant (Hostasol Red 5B, Clariant, 1.6 g/ml). The proportion of powder chemicals of density >3 g/ml is 43%. The density of crosslinking agent masterbatch VB2 is 1.79 g/ml, being comparable with that of crosslinking agent masterbatch 1 of working example 1.

Figure 2:
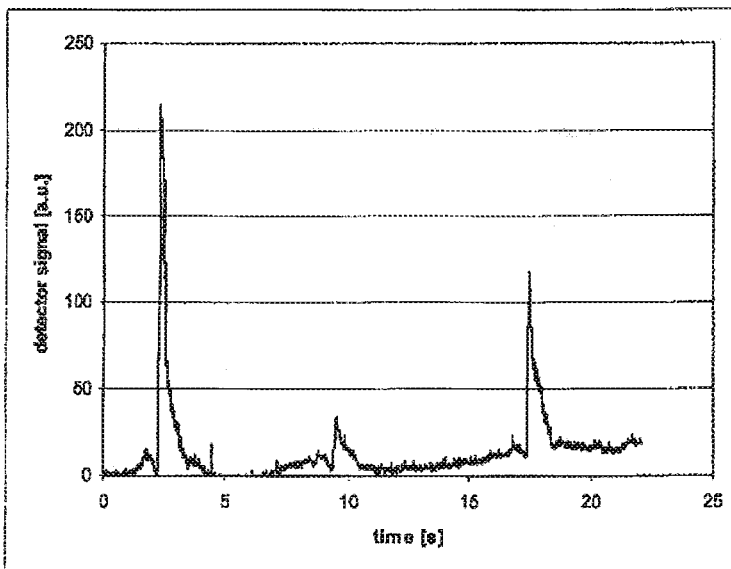

FIG. 2 shows the curve for the ultrasound signal plotted against time during extrusion of the parent mixture. As in working example 1, the variation (baseline drift) during extrusion of the rubber mixture is very small at <20 m$^{-1}$. Baseline noise is about 1 m$^{-1}$. Three measurements were made with different amounts added of crosslinking agent masterbatch VB2 of the invention.

When 3.2 g of VB2 were fed into the material (pulsed input), a peak is detected at t=3 min. with height 210 m$^{-1}$. When 0.3 g of VB 2 is fed into the material, the ultrasound signal at t=10 min. is about 30 1/m, and after 1.7 g of VB2 is fed into the material the ultrasound signal at t=18 min. amounts to about 110 m−1. The ultrasound signal is therefore proportional to the amount of crosslinking agent masterbatch VB2 metered into the material.

The amount of crosslinking agent masterbatch in a rubber mixture can therefore be detected by ultrasound.

Comparison of FIG. 1 and FIG. 2 moreover shows that when the same amount of crosslinking agent masterbatch is VB1 and VB2 is added, the attenuation (height of peak) for crosslinking agent masterbatch VB2 is markedly greater than for VB1. Even when the amount of VB 2 fed into the material is very small, 0.3 g, the signal in FIG. 2 can be clearly distinguished from the baseline drift. The higher attenuation provided by crosslinking agent masterbatch VB2 here cannot be attributed to a difference in density of the two masterbatches. The difference between the density calculated from the individual components is small: VB1 at 1.75 g/ml and VB 2 at 1.79 g/ml. The proportions of powder chemicals of density >3 g/ml are likewise comparable, with 37% (only ZnO) for VB1 and 43% (ZnO, iron carbonyl, chromium iron oxide, and doped strontium aluminates). The higher attenuation is therefore attributed to the presence of the carbonyl iron powder with density 7.9 g/ml. The sensitivity of the measurement method (intensity of the ultrasound signal) appears to be markedly more susceptible to heavy particles than to the less heavy marker substances used here.

Working Example 3

As in working example 1, the rubber mixture KM is first fed to the extruder. From the juncture t=0 min., a change is made from the feed of the rubber mixture to the feed of the crosslinkable rubber mixture VKM, plotted against time.

The crosslinkable rubber mixture was produced in advance by conventional roll processes from 161 phr of the rubber mixture KM and 14.3 phr of the crosslinking agent masterbatch VB2. The mixing time on the roll here was 10 min, with resultant reliably homogeneous dispersion of the crosslinking chemicals and of the marker substances of crosslinking agent masterbatch VB2 in the crosslinkable rubber mixture.

Figure 3:
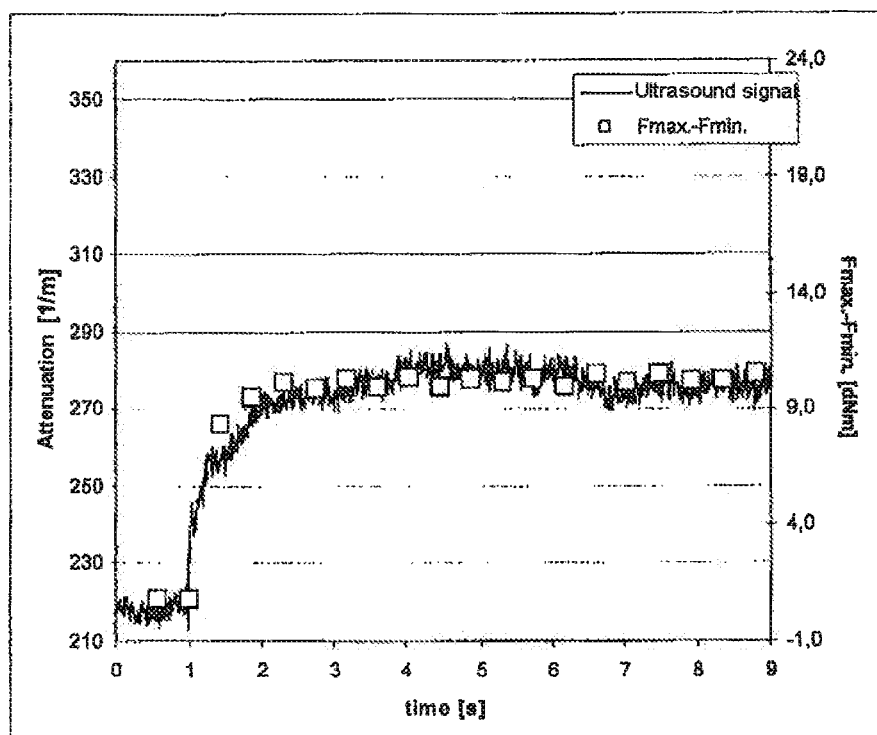

The extruded strip is analyzed inline as in working example 1 with the aid of two ultrasound transducers. FIG. 3 shows the curve for attenuation of the ultrasound by the extruded strip from t=0 min., plotted against time.

At the juncture t=0 min., the rubber mixture KM is still in the measurement dye. From the juncture t=1 min., the crosslinkable rubber mixture VKM reaches the ultrasound measurement chamber. The ultrasound signal (attenuation) rises in particular because of the marker substances present in the crosslinking agent masterbatch VB2. After a short time, the signal reaches a plateau. The crosslinkable rubber mixture has completely filled the ultrasound measurement dye. The crosslinkable rubber mixture is fed continuously to the system. The ultrasound signal remains constant over time. Only small variations in the range of about 10 to 20 m$^{-1}$ are discernible, corresponding to a crosslinkable rubber mixture in which the dispersion of the crosslinking agents and of the marker substances is homogeneous.

After conclusion of the experiment, the extruded strip is divided into 7 g portions. These specimens were vulcanized for 15 min. at 160° C. in an MDR rheometer from Alpha Technologies. The determination of the rheometer curves corresponds to offline quality control in the batchwise production of crosslinkable rubber mixtures. The difference $F_{max}$-$F_{min}$ between the maximum and minimum torque was determined from the resultant rheometer curves. This difference is proportional to the proportion of crosslinking agent. In FIG. 3, the $F_{max}$-$F_{min}$ values for the respective specimens have been inserted on the curve for the ultrasound signal plotted against time. $F_{max}$-$F_{min}$ is initially (t<1 min) close to zero, since the rubber mixture KM comprises no crosslinking agents. From t≥1 min., the values for $F_{max}$-$F_{min}$ increase and likewise reach a plateau. The curve for the values of $F_{max}$-$F_{min}$ plotted against time is the same as that for the ultrasound signal. The average spread for $F_{max}$-$F_{min}$ is very small, <1%, as expected for homogeneous dispersion of the crosslinking agents. The identical curves can provide impressive evidence that the crosslinking agent masterbatches of the invention permit inline spectroscopic monitoring of the crosslinking agent mixture. The two measurement methods provide evidence that dispersion of the crosslinking agent masterbatch VB 2 in KM is homogeneous.

Working Example 4

As in working example 1, the rubber mixture KM is extruded, and two ultrasound transducers are used to analyze the attenuation properties of the extruded strip. Unlike in working example 3, pellets of crosslinking agent masterbatch VB2 are fed irregularly to the rubber mixture KM from the juncture t=0 min. The single-screw extruder has only little mixing action, and although therefore a crosslinkable rubber mixture VKM is produced at the outgoing end of the extruder the dispersion of the crosslinking agents is very heterogeneous, because of the low level of mixing action and the irregularity of the amounts added.

Figure 4:
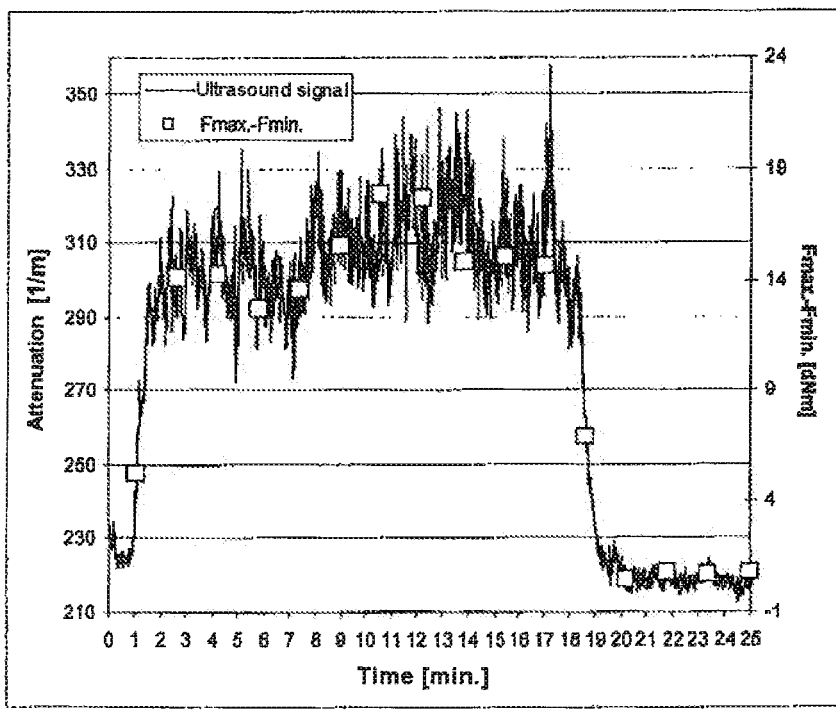

This is apparent in FIG. 4. Here, attenuation has again been plotted against measurement time t. Initially only small variations in the ultrasound signal are detected for feed at t<1 min. to the homogeneous rubber mixture KM. With additional irregular feed of pellets of crosslinking agent masterbatch VB2 (t>1 min.) to the material, although attenuation rises as in working example 3, FIG. 3, the ultrasound signal varies markedly. The variation of the ultrasound signal are in the region of about 80 m$^{-1}$, corresponding to markedly inhomogeneous dispersion of crosslinking agent masterbatch VB2 and, respectively, inhomogeneous dispersion of the marker substances. If feed of crosslinking agent masterbatch VB2 to the material is terminated (t>18 min), attenuation of the signal reduces. The original baseline for rubber mixture KM is regained, with little variation of the ultrasound signal.

Here again, as in working example 3, specimens are taken from the extruded strip and vulcanized for 15 min. at 160° C. (offline analysis). In FIG. 4, the $F_{max}$-$F_{min}$ values from the rheometer curves are again inserted on the curve plotted against time. It can be seen that the curve for the of $F_{max}$-$F_{min}$ plotted against time corresponds to the curve for the ultrasound signal plotted against time. The average spread of the values for $F_{max}$-$F_{min}$ between t=1 min and t=18 min. is markedly greater than the spread of the $F_{max}$-$F_{min}$ values in FIG. 3 for the homogeneously accelerated mixture.

Comparison of working example 4 with working example 3 shows that with the aid of inline ultrasound analysis it is possible to distinguish between homogeneous dispersion and heterogeneous dispersion of the crosslinking agent masterbatch VB2. The marker substances here (in the case of VB2 in particular iron powder) with high density >3 g/ml ensure high sensitivity of the measurements. The results using inline ultrasound analysis correlate with the results from the rheometer curves (conventional offline quality control for accelerated rubber mixtures).

What is claimed is:

1. A crosslinking agent masterbatch configured to provide inline detectable dispersion of the masterbatch within a polymer product during production of the polymer product from the masterbatch, the masterbatch comprising:
   at least one first polymer;
   at least one pulverulent marker substance dispersed within the first polymer and configured to be inline detectable within the polymer product during processing of the masterbatch with at least one additional polymer to produce the polymer product, wherein the pulverulent marker substance is solid at temperatures of less than 130° C., has a density greater than 2 g/cm$^3$, and is detectable by ultrasound analysis when dispersed in the polymer, wherein the marker substance is selected from the group consisting of alkali metal compounds, alkaline earth metal compounds, compounds of the transition groups of the periodic table of the elements, compounds of the rare earths, heavy metal powders, coated metal powders and/or compounds of these, lead compounds, inorganic bismuth compounds, metal carbides, and/or minerals selected from the group of antimonite, apatite, albite, almandine, anhydrite, aragonite, argentite, anglesite, arsenopyrite, baryta, bauxite, galena, cassisterite, cerussite, chloanite, celestine, dolomite, feldspar, fluorite, graphite, mica, ilmenite, corundum, cryolite, corrundum, magnetite, rnolybdenite, muscovite, montmorilonite, monazite, magensite, pyrite, quartz, rutile, scheelite, sperrylite, strontianite, tantalite, topaz, uraninite, vanadinite, bismuth, bismuthinite, wolframite, wollastonite, willemite, wulfenite, cinnabar, and/or zircon; and
   at least one crosslinking agent dispersed within the first polymer.

2. The crosslinking agent masterbatch of claim 1, wherein the at least one pulverulent marker substance comprises a chemical substance not having any further unnatural marking added thereto.

3. The crosslinking agent masterbatch of claim 2, wherein the at least one pulverulent marker substance has a density of at least 3.5 g/cm$^3$, a particle size of from 1 μm to 100 μm, and is a solid at temperatures below 100° C.

4. The crosslinkirig agent masterbatch of claim 2, wherein the at least one pulverulent marker substance has a density greater than 5.5 g/cm$^3$, a particle size of from 1 μm to 25 μm, and is a solid at temperatures below 80° C.

5. The crosslinking agent masterbatch of daim 1, wherein a proportion of marker substances in the masterbatch is less than 10% by weight.

6. The crosslinking agent masterbatch of claim 1, wherein the masterbatch additionally comprises at least one of plasticizers, stabilizers, fillers and further auxiliaries.

7. The crosslinking agent masterbatch of claim 1, wherein the at least one crosslinking agent is selected from the group consisting of sulfur, sulfur donors, peroxides, resorcinol, aldehyde-amine condensates, bisphenois, quinone dioximes, xarithogenate, carbamates, triazines, thiazoles, metal oxides, dithiccarbamates, thiurams, thioureas, mercapto accelerators, sulferiamides, thiophosphate accelerators, dithiophosphate accelerators, and/or guanidines.

8. The crosslinking agent masterbatch of claim 1, wherein at least one first polymer is selected from the group consisting of: natural rubber (NR), isoprene rubber (IR), styrene-butadiene rubber (SBR), butadiene rubber (BR), isoprene-isobutylene rubber (OR), polychioroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPDM), ethylene-propylene rubber (EPM), fluoro rubber (FKM), perfluorinated fluoro rubber (FFKM), acrylate-ethylene rubber (AEM), acrylate rubber (ACM), ethyleriernethylene-acrylate rubber (EMA), chlorinated polyethylene, chlorosullonaked polyethylene, ethylene-vinyl acetate rubber (EV A), ethylene-epichlorohydrin rubber (ECO), epichlorohydrin rubber (CO), and/or polyurethane rubber (PU).

9. A crosslinking agent masterbatch configured to provide inline detectable dispersion of the masterbatch within a polymer product during production of the polymer product from the masterbatch, the masterbatch comprising:
   at least a first polymer selected from the group consisting of: natural rubber (NR), isoprene rubber (IR), styrene-butadiene rubber (SBR), butadiene rubber (BR), isoprene-isobutyiene rubber (IIR), polychloroprene rubber (CR), acrylonitrile-butadiene rubber (NBR), hydrogenated acrylonitrile-butadiene rubber (HNBR), carboxylated acrylonitrile-butadiene rubber (XNBR), hydrogenated carboxylated acrylonitrile-butadiene rubber (HXNBR), ethylene-propylene-diene rubber (EPOM), ethylene-propylene rubber (EPM), fluor( )rubber (FKM), perfluorinated fluoro rubber (FFKM), acrylate-ethylene rubber (AEM), acrylate rubber (ACM), ethylenemethylene-acrylate rubber (EMA), chlorinated polyethylene, chlorosulfonated polyethylene, ethylene-vinyl acetate rubber (EVA), ethylene-epichlorchydrin rubber (ECO), epichlorohydrin rubber (CO), and/or polyurethane rubber (PU);

at least one pulverulent marker substance dispersed within the first polymer and configured to be inline detectable within the polymer product during processing of the masterbatch with at least one additional polymer to produce the polymer product, wherein the pulverulent marker substance is solid at temperatures of less than 130° C., has a density greater than 2 g/cm³ and is configured to be detectable by ultrasound analysis when dispersed in the polymer for inline determination of dispersion of the marker substance within the polymer, wherein the marker substance is selected from the group consisting of alkali metal compounds, alkaline earth metal compounds, compounds of the transition groups of the periodic table of the elements, compounds of the rare earths, heavy metal powders, coated metal powders and/or compounds of these, lead compounds, inorganic bismuth compounds, metal carbides, and/or minerals selected from the group of antimonite, apatite, albite, almandine, anhydrite, aragonite, argentite, anglesite, arsenopyrite, baryte, bauxite, galena, cassiterite, cerussite, chicanite, celestine, dolomite, feldspar, fluorite, graphite, mica, ilmenite, kaolin, corundum, cryollite, corrundum, magnetite, molybdenite, muscovite, montmorilonite, monazite, magensite, pyrite, quartz, rutile, scheelite, sperrylite, strontianite, tantalite, topaz, uraninite, vanadinite, bismuth, bismuthinite, wolframite, wollastonite, willemite, wulfenite, cinnabar, and/or zircon; and at least one crosslinking agent selected from the group consisting of sulfur, peroxides, metal oxides, dithiocarbamates, thiurams, thiourea s, mercapto accelerators, sulfenamides, thiophoaphate accelerators, dithiophosphate accelerators, and/or guanidines.

10. The crosslinking agent masterbatch of claim 9, wherein:

the marker substances comprise a chemical substance not having any further unnatural marking added thereto, and having a density of at least 3.5 g/cm³, a particle size of from 1 µm to 100 µm, and are solid at temperatures below 100° C.;

the marker substances are present in the masterbatch at an amount less than 10% by weight; and the marker substances comprise:
halides, sulfates, carbonates, oxides, and/or sulfides of rubidium-, of cesium, of calcium, of strontium, and/or of barium,
oxides of magnesium, zinc, titanium, zirconium, tungsten, iron, lead, bismuth, hafnium, gadolinium, and/or cerium,
sulfides of zinc, tungsten, lead, and/or bismuth,
tantalum powder, tungsten powder, gold powder, platinum powder, iridium powder,
tungstates, ferrites, and/or tungsten carbides, and/or
minerals selected from the group of antimonite, apatite, albite, almandine, anhydrite, aragonite, argentite, anglesite, arsenopyrite, baryte, bauxite, galena, cassisterite, cerussite, chloanite, celestine, dolomite, feldspar, fluorite, graphite, mica, ilmenite, kaolin, corundum, cryollite, corrundurn, magnetite, molybdenite, muscovite, montmorilonite, monazite, magensite, pyrite, quartz, rutile, scheeiite, sperrylite, strontianite, tantalite, topaz, uraninite, vanadinite, bismuth, bismuthinite, wolframite, woilastonite, willemite, wulfenite, cinnabar, and/or zircon.

11. A process for producing the crosslinking agent masterbatch as claimed in claim 1, the process comprising:

mixing the at least one first polymer, the at least one marker substance, and the crosslinking agent at temperatures ≤120° C. to disperse the at least one marker substance and the at least one crosslinking agent in the at least one first polymer and prevent cross-linking in the crosslinking agent masterbatch.

12. The process as claimed in claim 11, further comprising preventing cross-linking of the crosslinking agents during the mixing by mixing the marker substances with the crosslinking agent, and optionally also binder and/or stabilizers fillers, plasticizer, and/or other auxiliaries at temperatures less than 100° C.

13. A process for producing a crosslinkable rubber mixture, the process comprising;

producing a parent mixture comprising at least one rubber;
continuously mixing the crosslinking agent masterbatch as claimed in claim 1 or 9 with the parent mixture; and
detecting dispersion of the at least one marker substance in the mixture by ultrasound or spectroscopy during the mixing to determine dispersion of the masterbatch in the rubber mixture.

14. A crosslinkable rubber mixture obtained by the process as claimed in claim 13.

15. A method for inline monitoring of dispersion of crosslinking agents in a rubber mixture during processing of the rubber mixture, the method comprising mixing the crosslinking agent masterbatch as claimed in claim 1 or 9 into a rubber mixture and during processing of the mixture, detecting the marker substance in the mixture to determine the dispersion of the crosslinking agents in the rubber mixture.

16. The method for monitoring the dispersion of the crosslinking agents in a rubber mixture according to claim 15, further comprising detecting the marker substance by means of ultrasound.

* * * * *